United States Patent [19]

Weatherford et al.

[11] Patent Number: 4,663,728

[45] Date of Patent: May 5, 1987

[54] READ/MODIFY/WRITE CIRCUIT FOR COMPUTER MEMORY OPERATION

[76] Inventors: James R. Weatherford, 5500 Knights Ct., Lake Dallas, Tex. 75065; Arthur T. Kimmel, 4322 Windward Cir., Dallas, Tex. 75252

[21] Appl. No.: 622,459

[22] Filed: Jun. 20, 1984

[51] Int. Cl.[4] ............................................. G06F 12/06
[52] U.S. Cl. .................................................... 364/900
[58] Field of Search ... 364/200 MS File, 900 MS File

[56] References Cited

U.S. PATENT DOCUMENTS

| | | | |
|---|---|---|---|
| 4,225,959 | 9/1980 | Suelflow et al. | 364/900 |
| 4,467,419 | 8/1984 | Wakai | 364/200 |

OTHER PUBLICATIONS

Computer Organization and Micrprogramming Charpt 7, 1972, Prentice-Hall, Inc., Englewood Cliffs, New Jersey.
Chu, Y., Computer Organization and Micro-programming, Chap. 7, 1972, Prentice-Hall, Inc., Englewood Cliffs, New Jersey.

Primary Examiner—Archie E. Williams
Assistant Examiner—Emily Yue Chan
Attorney, Agent, or Firm—Richards, Harris, Medlock & Andrews

[57] ABSTRACT

A read/modify/write circuit (10) for a computer is used in conjunction with a main memory (12) in which block operations are executed using a plurality of data units. The circuit (10) includes a first register connected to receive a data block from the main memory (12), a second register connected to receive data units from a requestor, such as a processor (18) and a third register in which a resulting data block is produced which comprises the data units to be written into the main memory (12) and the remaining data units which were previously in the block read from memory (12). Multiplex circuits (70, 72, 74, 76, 78, 80, 82 and 84) are commanded by a decoder (136) in response to the processor (18) to selectively route sections of registers (26 and 28) into a register (106). The resulting data block is then transferred through the memory bus (14) for writing into the main memory (12). The outputs of the multiplexors (70-84) can be driven by the decoder (136) to a predetermined logic state so that a selected data block can be written into the main memory (12) for test and evaluation purposes.

7 Claims, 1 Drawing Figure

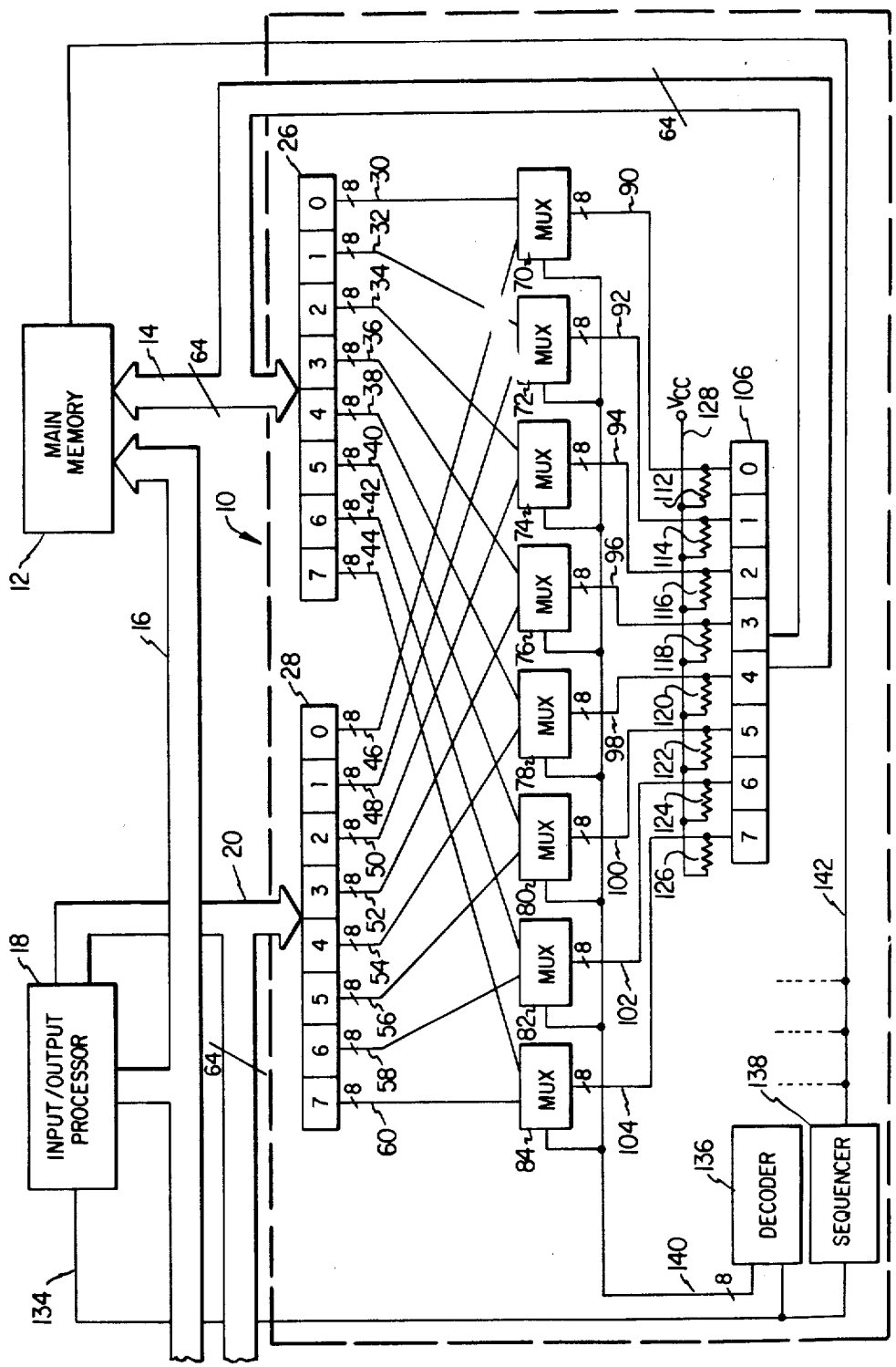

READ/MODIFY/WRITE CIRCUIT FOR COMPUTER MEMORY OPERATION

TECHNICAL FIELD

The present invention pertained in general to electronic circuits and in particular to the operation of a computer memory.

BACKGROUND OF THE INVENTION

In the operation of computer memory it has been found that overall speed of operation of the computer can be enhanced if the read and write memory operations are carried out in data blocks. Depending on the size of the computer, the data blocks may be of any size, for example, 32 or 64 bits. The actual data unit or operand size used by the computer is smaller than the data block. The data block is typically an integral multiple of the data unit size. For example, a computer which uses byte operands may have a memory block size of 64 bits, which is 8 bytes.

Although most of a computer's operation are more efficiently carried out when large blocks are transferred to and from the memory, certain operations are slow and cumbersome. In particular the operation of writing a small number of data units, less than one block, to the main memory of the computer. If only a full block can be written into the main memory, it is necessary for the software of the system to first determine the address for the block that is going to receive the new, small number of data units. This block is then read from the memory and transferred to the central processor of the computer. By means of executing a series of instructions the new data units are merged with the previously read data units to produce a new block in which a part of the data units are new and the remainder of the data units are old. This entire block is then transferred back to the main memory for a block write operation. This procedure requires that the software carry out numerous steps and is much slower than the conventional operation of writing an entire block into the main memory.

In a computer system which utilizes peripheral devices that are byte oriented and have a multibyte memory block size, there can be a considerable loss of processing time when the software operations must be diverted to perform less than full block write operations. Therefore, there exists a need for circuitry which can respond to a request for less than block write and proceed to write the selected data units into the main memory without requiring intervention of the system software.

SUMMARY OF THE INVENTION

A selected embodiment of the present invention comprises a read/modify/write circuit for a computer which has a main memory in which data is read and written in a data block. The data block has a plurality of data units. A memory bus is connected to exchange data blocks with the main memory and a requestor bus is connected to convey data from a requestor unit of the computer. The circuit includes a first register which is connected to the memory bus for receiving and storing a data block read from the main memory. A second register is connected to the requestor bus for receiving and storing data units received through the requestor bus. A third register is connected to the memory bus for transferring data blocks thereto. The first, second and third registers have corresponding sections for storing the respective data units that make up one of the data blocks. A plurality of routing circuits correspond respectively to the data units of the data block. Each routing circuit has two inputs which are connected respectively to the sections of the first and second register which store the corresponding data unit. Each routing circuit further has an output which is connected to the section of the third register which stores the corresponding data unit. Further circuitry is provided which is responsive to the requestor unit for selectively operating the routing circuit that transfers selected data units from the first and second registers to the third register to produce a new data block.

In a further aspect of the present invention, there is provided circuitry for driving the outputs of the routing circuits to a selected logic state so that a predetermined logic word is produced in the third register. This predetermined logic word can then be stored in the main memory where is can be used for various test and validation purposes.

BRIEF DESCRIPTION OF THE DRAWINGS

For a more complete understanding of the present invention and the advantages thereof, reference is now made to the following description taken in conjunction with the accompanying drawing in which the FIGURE is a schematic illustration of a portion of a computer system for providing a hardware operation of writing less than a full memory block into the main memory without use of a series of software execution steps.

DETAILED DESCRIPTION OF THE INVENTION

The present invention provides a method and apparatus wherein a requestor unit in a computer system can write less than a full block of data into the computer main memory without the need for invoking a series of software operations that can detract from the desired processing operation of the computer.

Referring now to the FIGURE, there is illustrated a circuit 10 for carrying out the read/modify/write operation in accordance with the present invention. The computer system which includes the circuit 10 also includes a main memory 12 which stores operands on a block basis. Each data block comprises a plurality of data units which are, for example, 8 bytes. Therefore each read or write operation comprises the transfer of 64 bits.

The memory 12 is connected to the circuit 10 through a bidirectional 64 bit memory bus 14. The main memory 12 further receives addresses through an address bus 16.

A requestor unit comprises an input/output processor 18 that is connected to transfer addresses to the bus 16. The processor 18 further is connected to a 64 bit bidirectional data bus 20.

The memory bus 14 is connected to a register 26 within the circuit 10. The register 26 has 8 sections which are labelled 0-7. Each of these sections holds 1 byte for a total of 64 bits. The data bus 20 is connected to a register 28 which also has 8 sections labelled 0-7. Register 28 likewise holds 64 bits. The 8 sections of register 26 are connected to respective 8 bit lines 30, 32, 34, 36, 38, 40, 42 and 44. Likewise the 8 sections are register 28 are connected to respective 8 bit lines 46, 48, 50, 52, 54, 56, 58 and 60.

The circuitry further includes a group of 8 multiplexors 70, 72, 74, 76, 78, 80, 82 and 84. A representative circuit for each of these multiplexors is a model 74F258 manufactured by Fairchild Camera and Instrument Company. Each of the multiplexors has two inputs and one output wherein each of the inputs can be selectively routed to the output or the output can be driven to a high impedance state. Thus, each of the multiplexors is a three-state device. Each of the multiplexors 70–84 corresponds to one of the sections of the registers 26 and 28. For register 26 the 8 output lines 30, 32, 34, 36, 38, 40, 42 and 44 are connected respectively to first inputs of the multiplexors 70, 72, 74, 76, 78, 80, 82 and 84. For the register 28, the output lines 46, 48, 50, 52, 54, 56, 58 and 60 are connected respectively to the second inputs of multiplexors 70, 72, 74, 76, 78, 80, 82 and 84.

The outputs of the multiplexors 70–84 are connected through respective 8 bit lines 90, 92, 94, 96, 98, 100, 102 and 104 to corresponding sections of a register 106. The register 106 is similar to register 26 and 28. Register 106 contains 8 sections labelled 0–7 for storing 64 bits. Register 106 is further connected to the memory bus 14 for transferring data blocks to the main memory 12.

A plurality of resistors 112, 114, 116, 118, 120, 122, 124 and 126 are connected respectively between the output lines 90, 92, 94, 96, 98, 100, 102 and 104 and a fixed voltage reference terminal 128. There is, in fact, a resistor for each of the paths in each of the output lines. Terminal 128 is typically the power supply VCC for the circuit 10.

The input/output processor 18 transmits control signals through a line 134 to a decoder 136 and sequencer 138 in the circuit 10. The decoder 136 decodes the commands received from the processor 18 and produces a plurality of command signals that are transmitted through a line 140 to selectively operate the multiplexors 70, 72, 74, 76, 78, 80, 82 and 84. The decoder 136 can command any one of the multiplexors to route a selected one of the inputs to the output or to drive the output to a high impedance state. The sequencer 138 coordinates and clocks the operation of the various registers and circuits within the circuit 10 and sequence the main memory 12 through a line 142 to perform a read operation and produce a data block that is transmitted through the bus 14 to the register 26.

Operation of the circuit 10 and related computer units is now described in reference to the FIGURE. Within an overall computer system the main memory 12 is read and written with blocks of data and in the present example each block comprises 64 bits which is a collection of 8 bytes. It is a frequent requirement that a requestor unit, such as the processor 18, write a number of bytes less than a full block, in the main memory 12. This requirement can also be initiated by the central processor unit (not shown) of the computer which uses the main memory 12. Thus, there can be many types of requestor units to work in conjunction with the circuit 10.

The input/output processor 18 is further described in copending application entitled Input/Output Processor for Computer filed June 20, 1984 having Ser. No. 622,445 with inventors John M. Golenbieski, David A. Nobles, Gaynel J. Lockhart, Thomas M. Jones and Alan D. Gant. This copending application is assigned to the assignee of the present application. The attorney docket number for this copending application is B-19,589.

The processor 18 has a number of data units, bytes, less than 8, that are to be written into the main memory 12. The count of the number of bytes and the address for the first of the bytes is transmitted from the processor 18. The address is transmitted through bus 16 to the main memory 12. The position and number of bytes to be written is transmitted through line 134 to the decoder 136. The selected data bytes are transmitted through the data bus 20 and stored in the appropriate sections of the register 28. In response to the command from the processor 18 the sequencer 138 causes the main memory to be read and retrieve the block of data into which the selected bytes will be stored. This block of data is transferred through the memory bus 14 into the register 26. The decoder 136 activates the selected multiplexor units 70–84 so that the particular bytes which have been stored in register 28 are routed through the multiplexors to the corresponding sections of the register 106. The sections of the register 106 which do not receive the data from register 28 are connected by the multiplexors 70–84 to receive the corresponding data units from the register 26. Thus, register 106 receives the new bytes to be written into the main memory 12 from register 28 and the unchanged bytes from register 26. There is thus produced in register 106 a new long word (64 bits) which includes the data bytes to be written into the main memory as requested by the processor 18. This new block is transferred from register 106 through the memory bus 14 and written into the main memory 12. This completes the operation requested by the processor 18. Each of these steps is carried out in the hardware rather than with software. No intervention was required by the central processing unit (not shown) to provide software processing operations to accomplish the same ultimate result. Thus the computer which includes circuit 10 can continue its productive processing without being interrupted by the requirement to write into memory with less than one full block.

In a further aspect of the present invention it is often necessary to write a predetermined logic state into the main memory 12 for the purpose of validating operation of various units or providing a test pattern. This is carried out by the use of the same sequence as described above. In this case, the requestor may be a central processor unit which functions basically the same way as the processor 18. A command sequence is transmitted through the equivalent of line 134 to the decoder 136. Selected ones are the multiplexors 70–84 are activated to produce a high impedance output. The resistors 112–126 pull the corresponding output lines 90–104 to a high voltage state when the multiplexors 70–84 produce a high impedance output condition. The high voltage state produced by the resistors comprises a predetermined logic state. This logic state is transferred into the selected ones of the sections of register 106. The sequence described above is completed by tranferring the data block in register 106 through the memory bus 14 and writing it into the main memory 12. By use of the circuit 10 a requestor, such as a central processor, an input/output processor, or a diagnostic unit can write a predetermined logic state into any desired address of the main memory 12 in a very rapid fashion without requiring intervention of the system software.

In summary, the present invention comprises a method and apparatus for writing less than block units into the main memory of a computer without the necessity to go through a series of cumbersome and time consuming software operations. Further, a predetermined logic state can be written into any desired address for test and evaluation purposes.

Although one embodiment of the invention has been illustrated in the accompanying drawing and described in the foregoing Detailed Description, it will be understood that the invention is not limited to the embodiment disclosed, but is capable of numerous rearrangements, modifications and substitutions of parts and elements without departing from the scope of the invention.

We claim:

1. A read/modify/write circuit for a computer which has a main memory in which data is read and written as a data block having a plurality of data units, a memory bus which is connected to exchange data blocks with the main memory and a requester bus which conveys data from a requester unit of the computer, the circuit comprising:
   a first register connected to said memory bus for receiving and storing a data block read from said main memory,
   a second register connected to said requester bus for receiving and storing data units received through said requester bus,
   a third register connected to said memory bus,
   said first, second and third registers each having corresponding sections for storing the respective data units that make up one said data block,
   a plurality of routing circuits corresponding respectively to said data units of said data block, each routing circuit having two inputs which are connected respectively to the sections of said first and second registers which sections store the data units corresponding to the routing circuit, each routing circuit having an output connected to the section of said third register which stores the data unit corresponding to the routing circuit, said routing circuits for transferring selected data units stored in said first and second registers to the corresponding section in said third register, and
   means responsive to said requester unit for selectively operating said routing circuits to transfer said selected data units from said first and second registers to said third register to produce a composite data block therein, said composite data block for transfer from said third register to said main memory thereby storing in said memory said data units received through said requester bus.

2. The read/modify/write circuit recited in claim 1 wherein each of said registers has eight sections each storing eight bit.

3. The read/modify/write circuit recited in claim 1 wherein said routing circuits, in response to a command from said requester unit, selectively provide a high impedance output to isolate said routing circuits from said third register, and said read/modify/write circuit includes means connected to inputs of said sections of said third register for driving said inputs to a predetermined logic state for producing in said third register a data block having said predetermined logic state.

4. The read/modify/write circuit recited in claim 3 wherein said means for driving comprises a plurality of resistors connected respectively between the output of said routing circuits and a fixed voltage terminal.

5. A method for performing a read/modify/write operation independent of a sequence of software instructions in a computer having a main memory in which data is read and written in data blocks which have a plurality of data units, a memory bus is connected to exchange data blocks with the main memory, and a requester bus conveys data units from a requester unit of the computer, the method comprising the steps of:
   reading selected data block from said main memory and transferring said selected data block through said memory bus to a first register,
   transferring at least one data unit from said requester unit through said requester bus to a second register, wherein said first and second registers have corresponding sections for storing data units to make up one said data block,
   in response to a command from said requester unit, transferring the data unit stored in said second register into corresponding sections in a third register and transferring data units from said first register into the corresponding sections of said third register which did not receive data units from said second register, and
   transferring the data units stored in said third register through said memory bus for writing into said main memory as a data block.

6. The method recited in claim 5 wherein the step of reading a selected data block from said main memory comprises reading a 64 bit word and transmitting said 64 bit word through said memory bus for storing in said first register.

7. The method recited in claim 5 including the step of entering a predetermined logic state into said third register prior to transferring the data units stored in said third register to said main memory for the purpose of testing elements of said computer such as, for example, said third register of said main memory.

* * * * *